(12) United States Patent
Lam et al.

(10) Patent No.: US 9,542,120 B2
(45) Date of Patent: Jan. 10, 2017

(54) SYSTEMS AND METHODS FOR PROCESSING INSTRUCTIONS WHILE REPAIRING AND PROVIDING ACCESS TO A COPIED VOLUME OF DATA

(71) Applicant: CIRRUS DATA SOLUTIONS, INC., Jericho, NY (US)

(72) Inventors: Wai Lam, Jericho, NY (US); Wayne Lam, Jericho, NY (US)

(73) Assignee: CIRRUS DATA SOLUTIONS, INC., Jericho, NY (US)

( * ) Notice: Subject to any disclaimer, the term of this patent is extended or adjusted under 35 U.S.C. 154(b) by 456 days.

(21) Appl. No.: 14/132,401

(22) Filed: Dec. 18, 2013

(65) Prior Publication Data

US 2014/0181445 A1 Jun. 26, 2014

Related U.S. Application Data

(60) Provisional application No. 61/740,891, filed on Dec. 21, 2012.

(51) Int. Cl.
*G06F 3/06* (2006.01)

(52) U.S. Cl.
CPC ............... *G06F 3/065* (2013.01); *G06F 3/067* (2013.01); *G06F 3/0619* (2013.01); *G06F 3/0659* (2013.01)

(58) Field of Classification Search
CPC ...... G06F 3/065; G06F 3/0619; G06F 3/0659; G06F 3/067; G06F 3/06; G06F 5/00; G06F 7/00; G06F 13/00
See application file for complete search history.

(56) References Cited

U.S. PATENT DOCUMENTS

| | | | | |
|---|---|---|---|---|
| 8,051,044 B1* | 11/2011 | Dyatlov | ............... | G06F 11/1451 707/625 |
| 2012/0221521 A1* | 8/2012 | Chiu | ................... | G06F 11/3485 707/622 |

* cited by examiner

*Primary Examiner* — Farley Abad
(74) *Attorney, Agent, or Firm* — Lucas & Mercanti, LLP; Jonathan A. Tyler

(57) ABSTRACT

A volume of data is copied from a first location to a second location. A procedure to repair a volume of data is initiated. A first instruction associated with the repair procedure is selectively redirected to a staging storage, based on a determination that the first instruction relates to an action that makes a change to the volume. A second instruction is selectively redirected to one of the staging storage and the volume, based on data stored in the staging storage.

8 Claims, 10 Drawing Sheets

SYSTEMS AND METHODS FOR PROCESSING INSTRUCTIONS WHILE REPAIRING AND PROVIDING ACCESS TO A COPIED VOLUME OF DATA

This application claims the benefit of U.S. Provisional Patent Application No. 61/740,891, filed on Dec. 21, 2012, which is incorporated herein in its entirety.

TECHNICAL FIELD

This specification relates generally to systems and methods for storing and managing data, and more particularly to systems and methods for processing instructions while repairing and providing access to a copied volume of data.

BACKGROUND

The storage of electronic data, and more generally, the management of electronic data, has become increasingly important. With the growth of the Internet, and of cloud computing in particular, the need for data storage capacity, and for methods of efficiently managing stored data, continue to increase. Many different types of storage media are currently used to store data, including disk drives, tape drives, optical disks, redundant arrays of independent disks (RAIDs), Fibre channel-based storage area networks (SANs), etc.

When accessing data stored on a storage medium, a computer generally follows a set of predetermined procedures. For example, a computer's operating system typically uses a process known as mounting to make a storage medium accessible through the computer's file system. Mounting a medium on which data is stored can ensure that a computer recognizes the medium's format. Files can only be accessed on a mounted medium.

The steps required to mount a storage medium may vary depending on factors such as the nature of the medium, the medium's file system, etc. In many cases, a series of mounting procedures corresponding to various aspects of the medium's file system must be performed. After a medium is successfully mounted, a computer typically incorporates the medium's data and creates a mount point through which the data stored on the medium is accessed.

In many cases, the process of mounting a storage medium is complicated by the need to repair certain portions of the data stored on the medium. For example, certain operations, such as copying data of an active volume to a second storage medium, can result in logical inconsistencies to the second medium's file system. If a computer attempts to mount the second storage medium after such an operation has been performed, any logical damage that has occurred to the second medium's file system can prevent the stored data from being mounted successfully. In such cases, data repair, or data recovery, involving salvaging corrupted or inaccessible data, may be necessary. After the stored data is repaired, the second storage medium may be successfully mounted. However, if the copy operation involves copying an active volume (in which the data in the original volume is constantly changing), it may be necessary to keep track of any data newly written to the original volume. To complete the copy operation, it may be necessary or desirable also to copy the newly written data to the second volume. However, any repair operation performed with respect to the second volume or medium may permanently alter the second volume or medium in a manner that is inconsistent with the copy operation.

SUMMARY

In accordance with an embodiment, a method of copying and providing access to a copied volume of data is provided. A first volume stored at a first location, the first volume comprising a first plurality of blocks, is copied to a second volume stored at a second location, the second volume comprising a second plurality of blocks. A staging storage having a plurality of records corresponding to the second plurality of blocks is generated. A first instruction to write specified data to a first specified block of the second volume is received during a repair procedure. The specified data is written to a record of the staging storage that corresponds to the first specified block, in response to the first instruction. The second volume is mounted after completion of the repair operation. A second instruction to read data from the first specified block of the second volume is received. A determination is made that the record of the staging storage includes valid data. The specified data is read from the record of the staging storage, in response to determining that the record of the staging storage includes valid data.

In one embodiment, a third instruction to read data from a second specified block of the second volume is received during the repair procedure. A determination is made that a second record of the staging storage that corresponds to the second specified block does not include valid data. Data is read from the second specified block of the second volume, in response to determining that a second record of the staging storage that corresponds to the second specified block does not include valid data.

In another embodiment, a map having a second plurality of records corresponding to the plurality of records in the staging storage is generated. Information indicating that the record of the staging storage includes valid data is stored in a selected record of the map, in response to writing the first data to the record of the staging storage.

In another embodiment, a determination is made that the record of the staging storage includes valid data, based on the information stored in the map, and a determination is made that the second record of the staging storage that corresponds to the second specified block does not include valid data, based on second information stored in the map.

In another embodiment, the second volume is resynchronized with the first volume.

In accordance with another embodiment, a method of repairing and providing access to a volume of data is provided. A procedure to repair a volume of data is initiated. A first instruction associated with the repair procedure is selectively redirected to a staging storage, based on a determination that the first instruction relates to an action that makes a change to the volume. A second instruction is selectively redirected to one of the staging storage and the volume, based on data stored in the staging storage.

In one embodiment, the first instruction is selectively redirected to the staging storage, based on a determination that the first instruction comprises an instruction to write specified data to a specified block of the volume. The specified data is written to a record of the staging storage that corresponds to the specified block.

In another embodiment, the second instruction comprises an instruction to read data from a second specified block of the volume. The second instruction is redirected to the staging storage, if a second record in the staging storage that corresponds to the second specified block includes valid data. The second instruction is redirected to the volume, if the second record does not include valid data.

In one embodiment, information identifying the record of the staging storage that corresponds to the specified block is recorded in a map. The second instruction identifies a second specified block of the volume. A determination is made whether a second record of the staging storage that corresponds to the second specified block comprises valid data, based on second information stored in the map.

In one embodiment, the volume is mounted, and access to the volume is provided to a client.

In one embodiment, data is copied from a second volume to the volume, prior to initiating the procedure to repair the volume. The volume is resynchronized with the second volume, after mounting the volume.

In accordance with another embodiment, a device is provided. The device comprises a memory storing computer program instructions, and a processor. The processor is configured to execute the computer program instructions which, when executed on the processor, cause the processor to perform operations comprising initiating a procedure to repair a volume of data, selectively redirecting a first instruction associated with the repair procedure to a staging storage, based on a determination that the first instruction relates to an action that makes a change to the volume, and selectively redirecting a second instruction to one of the staging storage and the volume, based on data stored in the staging storage.

These and other advantages of the present disclosure will be apparent to those of ordinary skill in the art by reference to the following Detailed Description and the accompanying drawings.

DETAILED DESCRIPTION

In accordance with an embodiment, a method of providing access to a copied volume of data is provided. A volume of data is copied from a first location to a second location. A procedure to repair the copied volume is initiated. A first instruction associated with the repair procedure is selectively redirected to a staging storage, based on a determination that the first instruction relates to an action to make a change to the copied volume. A second instruction is selectively redirected to the staging storage or to the copied volume, based on data stored in the staging storage.

In one embodiment, the first instruction is selectively redirected to the staging storage, based on a determination that the first instruction comprises an instruction to write specified data to a specified block of the volume. The specified data is written to a record of the staging storage that corresponds to the specified block.

In another embodiment, the second instruction comprises an instruction to read data from a second specified block of the copied volume. The second instruction is redirected to the staging storage, if a second record in the staging storage that corresponds to the second specified block includes valid data. The second instruction is redirected to the volume, if the second record does not include valid data.

The copied volume is mounted, and access to the copied volume is provided to a user.

Figure 1A:
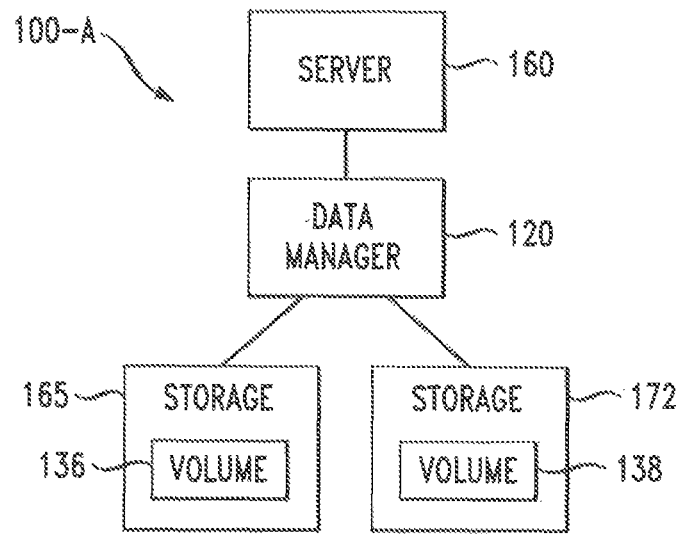
FIG. 1A shows a communication system that may be used to provide data storage services and data management services in accordance with an embodiment.

FIG. 1A shows a communication system 100-A that may be used to provide data storage and data management services in accordance with an embodiment. Communication system 100-A includes a server 160, a data manager 120, a storage 165, and a storage 172.

Data manager 120 is connected to server 160, either directly or via a network. For example, data manager 120 may be connected to server 160 via a Fibre channel network. Data manager 120 is connected to storage 165 and to storage 172, either directly or via one or more networks. For example, data manager 120 may be connected to storage 165 and to storage 172 via respective links in a Fibre channel network.

Figure 1B:
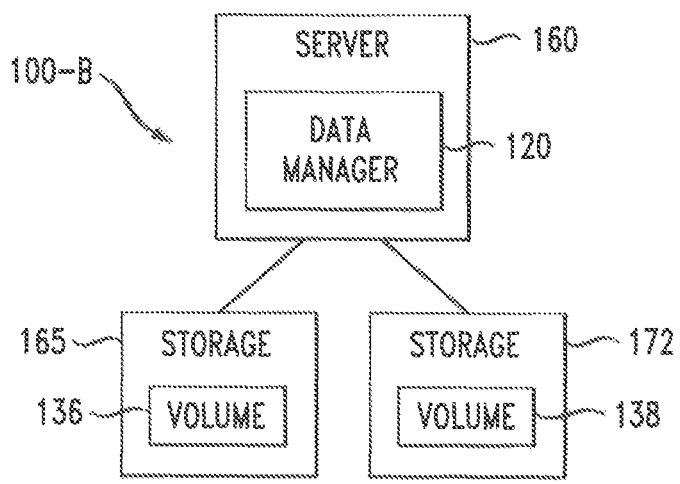
FIG. 1B shows a communication system that may be used to provide data storage services and data management services in accordance with another embodiment.

FIG. 1B shows a communication system 100-B that may be used to provide data storage and data management services in accordance with another embodiment. Communication system 100-B also includes server 160, storage 165, and storage 172. In the embodiment of FIG. 1B, data manager 120 resides and operates on server 160.

Storage 165 stores data. For example, storage 165 may store any type of data, including, without limitation, files, spreadsheets, images, audio files, source code files, etc. Storage 165 may store data in accordance with any suitable format or structure. For example, storage 165 may store data organized in volumes, blocks, files, sectors, etc. Storage 165 may store data in one or more databases or in another data structure. Storage 165 may be implemented, for example, using a storage device, a storage system, or another type of device or apparatus.

Storage 165 may from time to time receive, from another entity, a request to store specified data, and in response, store the specified data. For example, storage 165 may store data in response to a request received from server 160. Storage 165 may also from time to time receive, from another entity, a request for access to stored data and, in response, provide the requested data to the requesting entity, or provide access to the requested data. Storage 165 may verify that the requesting entity is authorized to access the requested data prior to providing access to the data.

In an illustrative embodiment, storage 165 stores one or more volumes of data.

Storage 172 stores data. For example, storage 172 may store any type of data, including, without limitation, files, spreadsheets, images, audio files, source code files, etc. Storage 172 may store data in accordance with any suitable format or structure. For example, storage 172 may store data organized in volumes, blocks, files, sectors, etc. Storage 172 may store data in one or more databases or in another data structure. Storage 172 may be implemented, for example, using a storage device, a storage system, or another type of device or apparatus.

Storage 172 may from time to time receive, from another entity, a request to store specified data, and in response, store the specified data. For example, storage 172 may store data in response to a request received from server 160. Storage 172 may also from time to time receive, from another entity, a request for access to stored data and, in response, provide the requested data to the requesting entity, or provide access to the requested data. Storage 172 may verify that the requesting entity is authorized to access the requested data prior to providing access to the data.

In an illustrative embodiment, storage 172 stores one or more volumes of data.

Server 160 may be any computer or other processing device. For example, server 160 may be, without limitation, a personal computer, a laptop computer, a tablet device, a server computer, a mainframe computer, a workstation, a wireless device such as a cellular telephone, a personal digital assistant, etc. Server 160 may from time to time transmit a request to store or retrieve data, or a request for a particular data storage-related service, to storage 165 or to storage 172. Server 160 may comprise a display device to display information to a user. Server 160 may also include a mechanism for receiving input from a user, such as a keyboard, a mouse, a touch screen, etc.

Data manager 120 monitors the storage and retrieval of data from storage 165 and/or storage 172. In one or more embodiments, data manager 120 may monitor data storage activities transparently. For example, data manager 120 may from time to time detect from server 160 a request for stored data and, in response, perform a selected function. In various embodiments, data manager 120 may comprise software, hardware, or a combination of software and hardware. In the embodiment of FIG. 1A, data manager 120 may be implemented using, for example, a server computer, a personal computer, a workstation, a mainframe computer, a tablet computer, a workstation, etc. In the embodiment of FIG. 1B, data manager 120 may be implemented using, for example, a software module that resides on server 160.

Data manager 120 may also from time to time access selected data and copy the data from a first storage location to a second storage location. For example, data manager 120 may copy a volume of data from storage 165 to storage 172. Alternatively, data manager 120 may copy a volume of data from a first location in a storage system to second location in the same storage system.

In one embodiment, data manager 120 is connected to the Internet and maintains a website that allows a user to manage the operations performed by data manager 120. For example, the website may provide options to store data, copy data, back up data, replicate data, migrate data, etc. When a user selects a particular option, data manager 120 receives the selection and, in response, performs the desired function.

In the illustrative embodiments of FIGS. 1A and 1B, various components, including data manager 120, server 160, storage 165, and storage 172, and components thereof including data management service 235 and repair process 280, may from time to time generate and transmit (or issue) input/output commands relating to data stored in a storage or memory. An input/output command may comprise an instruction, such as a read instruction to read specified data from a specified storage location, or a write instruction to write specified data to a specified storage location. An input/output command may also comprise other types of information, such as header information, etc. An instruction contained in an input/output command, or information derived from the instruction, may be obtained from the input/output command and processed in accordance with the methods described herein.

Figure 2:
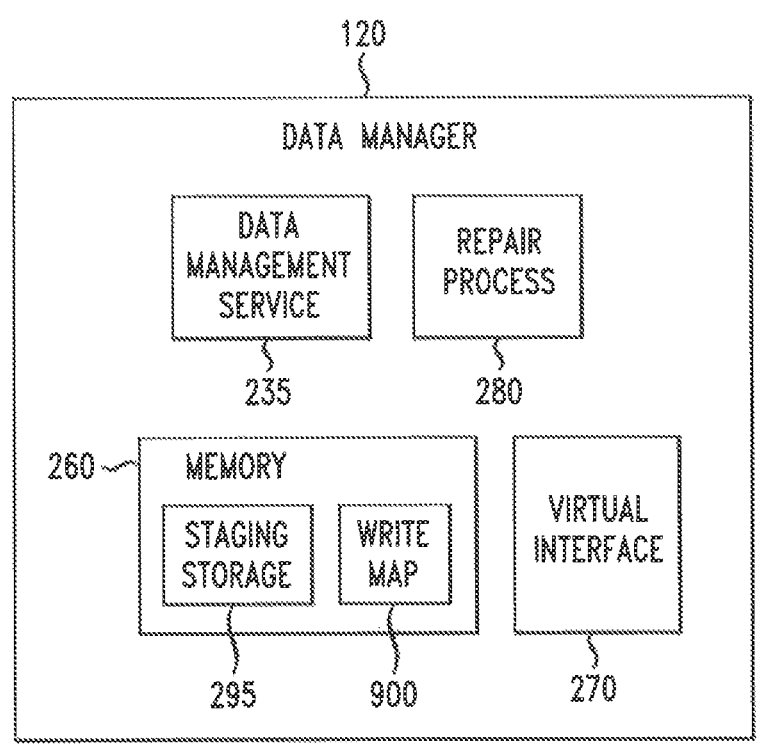
FIG. 2 shows components of a data manager in accordance with an embodiment.

FIG. 2 shows components of data manager 120 in accordance with an embodiment. Data manager 120 comprises a data management service 235, a repair process 280, a virtual interface 270, and a memory 260. In other embodiments, data manager 120 may include other components not shown in FIG. 2.

Memory 260 stores data. Memory 260 may store any type of data, in any format. For example, memory 260 may store one or more volumes of data, one or more tables, one or more maps, one or more records, etc.

Data management service 235 performs one or more services and other activities relating to data storage. For example, data management service 235 may receive from server 160 a request to store specified data, and in response, cause the specified data to be stored in storage 165 and/or in storage 172. Data management service 235 may also receive from server 160 a request to retrieve specified data from storage, and in response, retrieves the specified data from the appropriate storage and provides the data to server 160.

In the illustrative embodiment, data management service 235 also provides a copy function. For example, data management service 235 may copy data from a first volume (referred to as the "source volume") stored at a first location, to a second volume (referred to as the "destination volume") stored at a second location. In one embodiment, the source volume and the destination volume are stored in different storage systems or devices. In another embodiment, the source volume and the destination volume are stored in the same storage system or on the same storage device. In other embodiments, data management service 235 may copy data organized in another format, such as a selected block of data, a selected sector on a disk, a selected data file, etc., from a first location to a second location. In another embodiment, data management service 235 may copy the entire contents of a disk drive, tape drive, optical disk, etc., to a second storage location.

Data management service 235 may copy a volume of data from a first location to a second location for any of a variety of reasons. For example, a user employing server 160 may access data manager 120 and select an option to copy a volume, back up a volume, generate a snapshot of a volume, replicate a volume, migrate a volume from a first storage location to a second storage location, etc. Any of these functions may require generating one or more copies of the specified volume. Server 160 may accordingly transmit to data manager 120 a request to copy the specified volume from its current storage location to a second location. When data management service 235 receives the request, data management service 235 accesses the specified volume at its current storage location and copies the volume to the second location.

Data management service 235 may also provide a resynchronization function. For example, after a source volume is copied, it may be desirable to resynchronize the destination volume to the source volume (for example, if the source volume was changed during the copy procedure).

In many environments, it is desirable to mount a copied volume so that a user may inspect the data therein and verify that the copied volume is a valid copy of the source volume. For example, a user may wish to visually inspect the copied data, or use a specialized software application to test and verify that the copied data is correct. Data management service 235 therefore also provides a mounting function to enable users to mount and inspect a copied volume of data.

Repair process 280 repairs data. For example, after copying data from a first storage location to a second storage location, data manager 120 may instruct repair process 280 to examine and repair the copied data. Repair process 280 may repair data in accordance with any suitable method, which may depend on the nature of the relevant storage medium, the medium's file system, etc. During a repair procedure, repair process 280 may issue input/output commands containing instructions to read a portion of the copied data. Repair process 280 may also issue input/output commands containing instructions to write specified data to a specified location within the copied data.

Virtual interface 270 manages instructions received during and after a repair procedure and/or a subsequent mounting procedure. For example, if data manager 120 instructs repair process 280 to repair data in a copied volume, virtual interface 270 may selectively redirect instructions related to the copied volume during the repair procedure in order to ensure that the copied volume is unchanged during the repair procedure. Virtual interface 270 may similarly redirect instructions after a mounting procedure to enable a user to access and inspect the data in the copied volume.

The redirecting of instructions, as performed by virtual interface 270, may be accomplished using any suitable mechanism. For example, in one embodiment, when data manager 120 receives a first input/output command comprising a first instruction relating to a selected volume of data, selected information derived from the first input/output command, including the first instruction, may be forwarded to virtual interface 270. Virtual interface 270 may receive and examine the first instruction, generate a second instruction to perform a selected action, based on the first instruction, and transmit the second instruction to a selected memory or storage in the form of a second input/output command. The second instruction may be similar in nature to the first instruction, or may be different in nature. Other methods of redirecting instructions may be used.

The process of mounting a copied volume is often complicated by the need to repair certain portions of the data within the copied volume. For example, certain operations, such as copying data to a selected storage medium, can result in logical damage to the medium's file system. If a computer attempts to mount the storage medium after such an operation has been performed, logical damage that has occurred to the medium's file system can prevent the stored data from being mounted successfully. In such cases, data repair, or data recovery, involving salvaging corrupted or inaccessible data, may be necessary.

However, current methods of repairing data typically require making changes to the data. Conducting a data repair procedure that changes a copied volume can be disadvantageous and counterproductive to the performance of many data management functions. For example, after being altered by a data repair procedure, a copied volume cannot be re-synchronized with the source volume. There is accordingly a need for systems and methods to enable copying of data from a source volume to a destination volume, and to enable mounting of the destination volume for inspection, without altering the copied data in the destination volume.

Improved systems, methods, and apparatus for copying data and mounting the copied data are described herein. In an illustrative embodiment, a user employing server 160 wishes to copy a particular volume of data from a first storage location to a second storage location. Referring to the illustrative embodiment of FIG. 1A, suppose that the user wishes to copy volume 136 from storage 165 to storage 172. The user employs server 160 to access data manager 120 in order to utilize the copy function provided by data manager 120. For example, the user may access a graphical user interface provided by data manager 120 and select an option to copy volume 136 to storage 172. Server 160 accordingly transmits to data manager 120 a request to copy volume 136 to storage 172.

Figure 3A:
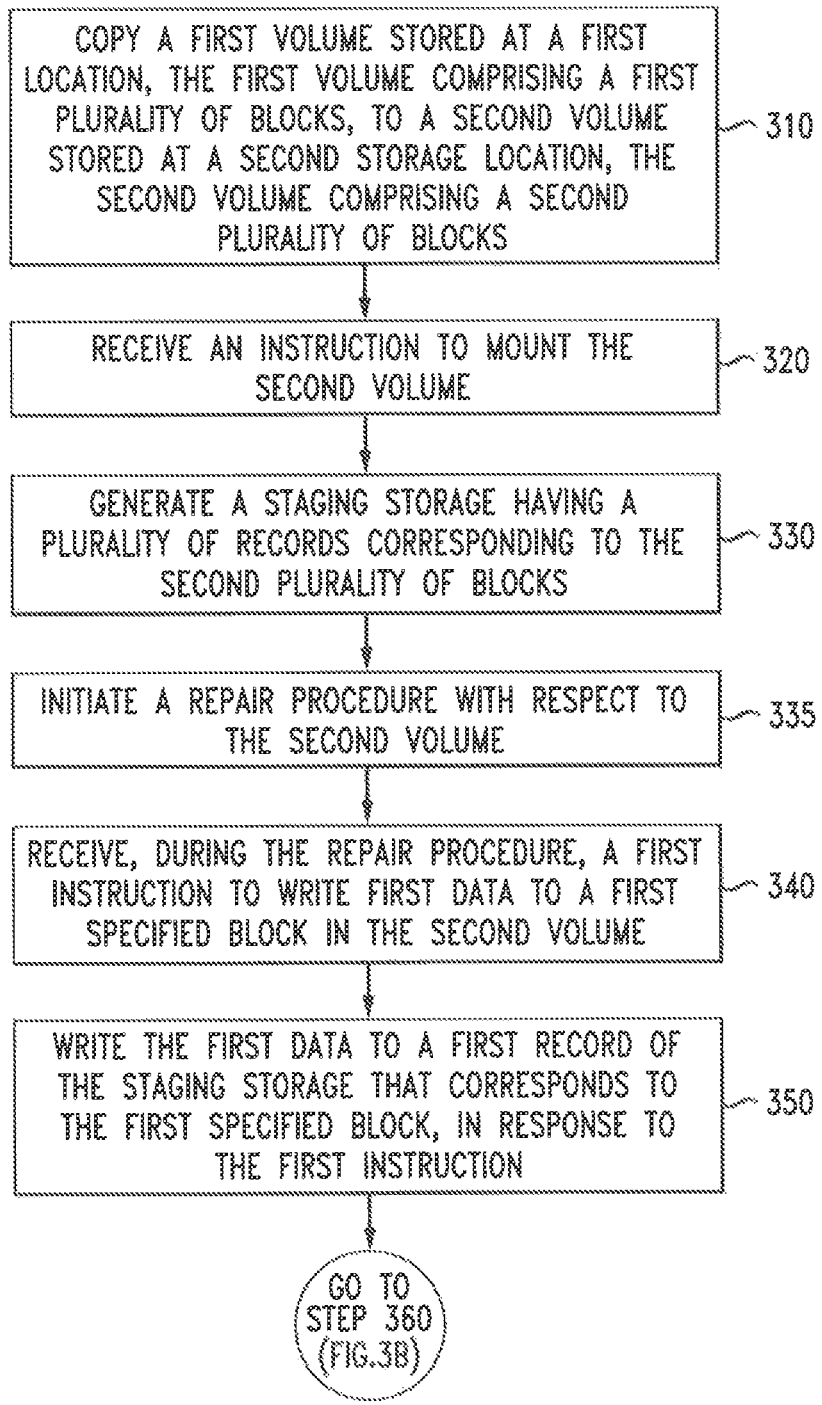
FIGS. 3A-3B show a flowchart of a method of copying a volume and providing access to the copied volume in accordance with an embodiment.
Figure 3B:
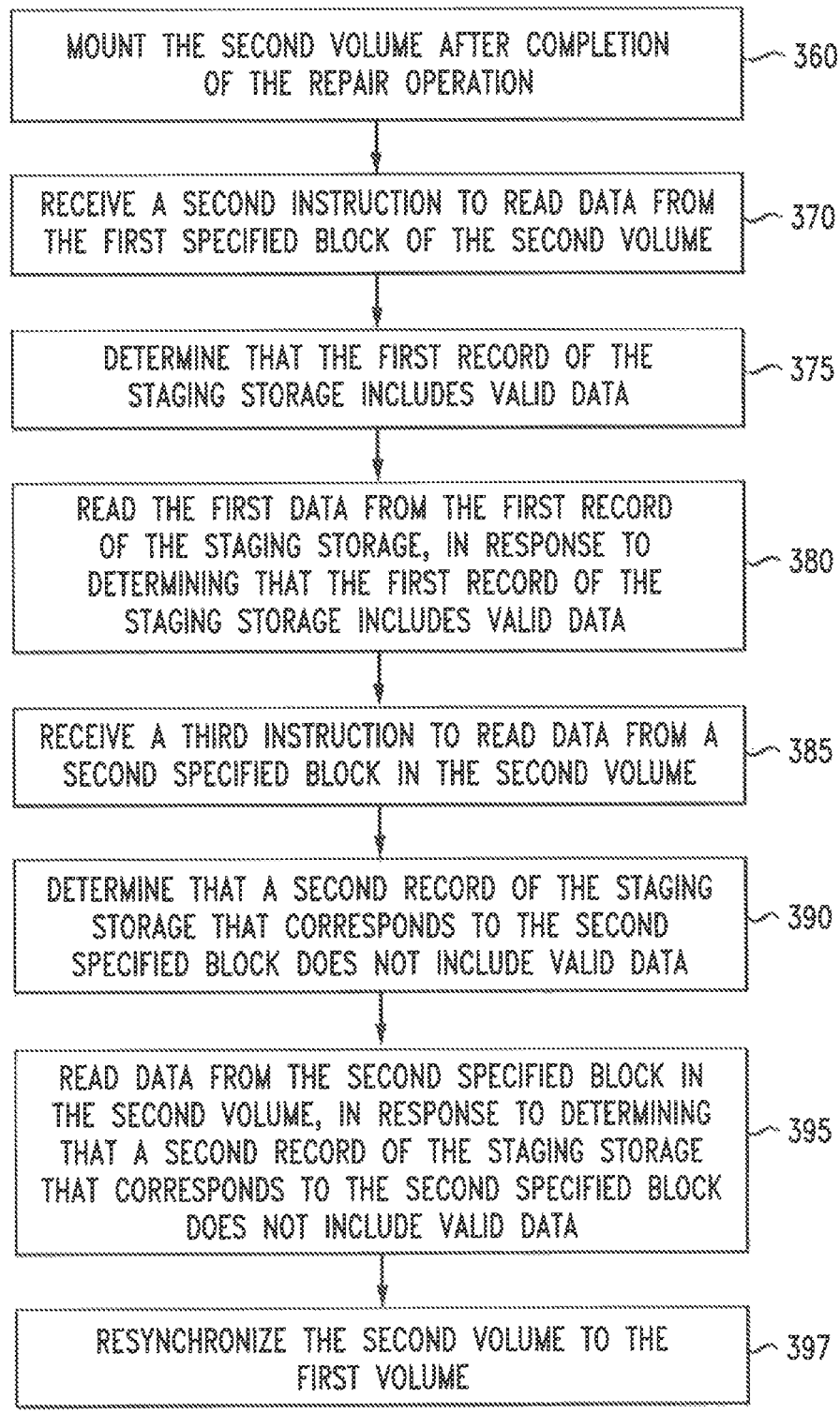

Data management service 235 receives the request to copy volume 136 and, in response, copies the data in volume 136 to storage 172. FIGS. 3A-3B show a flowchart of a method of copying a volume and providing access to the copied volume in accordance with an embodiment.

At step 310, a first volume stored at a first location, the first volume comprising a first plurality of blocks, is copied to a second volume stored at a second storage location, the second volume comprising a second plurality of blocks. In the illustrative embodiment, volume 136 comprises a plurality of blocks. Data management service 235 copies each block of volume 136 to storage 172. In this discussion, the terms "data block" and "block" are used interchangeably.

Figure 4A:
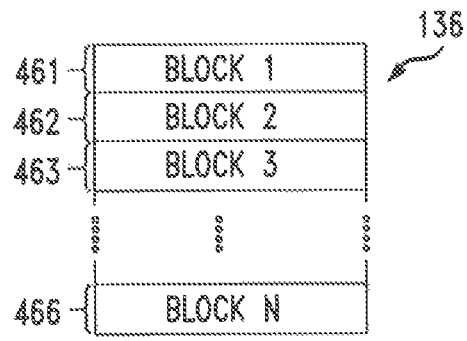
FIG. 4A shows a volume in accordance with an embodiment.

FIG. 4A shows volume 136 in accordance with an embodiment. Volume 136 comprises a plurality of data blocks, including Block 1 (461), Block 2 (462), Block 3, (463), . . . , Block N (466). In other embodiments, volume 136 may be structured differently.

Figure 4B:
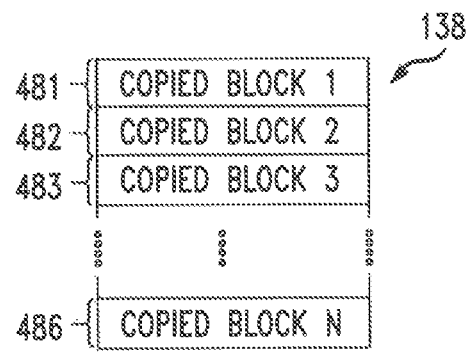
FIG. 4B shows a copied volume in accordance with an embodiment.

Data management service 235 copies each block in volume 136 and stores the copied blocks in a volume 138 in storage 172, as shown in FIG. 1A. FIG. 4B shows volume 138 in accordance with an embodiment. Volume 138 comprises a plurality of data blocks corresponding to the data blocks of volume 136. Thus, volume 138 includes Copied Block 1 (481), corresponding to Block 1 (461) of volume 136, Copied Block 2 (482) corresponding to Block 2 (462), Copied Block 3 (483) corresponding to Block 3 (463), . . . . Copied Block N (486) corresponding to Block N (466).

In the illustrative embodiment, after the copy procedure is complete, the user selects an option to mount (copied) volume 138. For example, the user may select an option on a graphical user interface provided by server 160, or by data manager 120. The user may wish to mount volume 138 in order to access and inspect the copied data in volume 138 and verify that volume 138 is a complete and accurate copy of volume 136, for example.

For example, the user may wish to access volume 138 and verify that the copied data is complete and accurate before deleting volume 136, or before disconnecting storage 165 from a network, or before resynchronizing. The user therefore generates a request to mount volume 138. Server 160 transmits to data manager 120 a request to mount volume 138.

At step 320, an instruction to mount the second volume is received. Data management service 235 receives the request to mount volume 138. Prior to mounting volume 138, data management service 235 causes repair process 280 to conduct a repair procedure with respect to volume 138.

Staging Storage

In order to ensure that the repair procedure is accomplished without altering the copied data in volume 138, data manager 120 generates a staging storage to which selected instructions are redirected.

Figure 5:
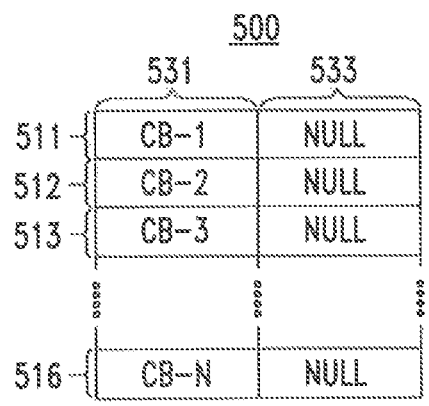
FIG. 5 shows a staging storage in accordance with an embodiment.

Thus, at step 330, a staging storage having a plurality of records corresponding to the second plurality of blocks is generated. Data management service 235 creates a staging storage having a structure based on the structure of volume 138. FIG. 5 shows a staging storage 500 in accordance with an embodiment. Staging storage 500 comprises columns 531 and 533. Column 531 holds an identifier of a respective data block stored in volume 138. Column 533 stores data associated with the data block identified in column 531. Staging storage 500 thus comprises a plurality of records equal in number to the number of blocks in volume 138. Accordingly, staging storage 500 includes record 511, which contains an identifier CB-1 associated with Copied Block 1 (481) of volume 138, record 512, which contains an identifier CB-2 associated with Copied Block 2 (482) of volume 138, record 513, which contains an identifier CB-3 associated with Copied Block 3 (483) of volume 138, and record 516, which contains an identifier CB-N associated with Copied Block N (486) of volume 138. In other embodiments, staging storage 500 may have a different structure and contain different types of information.

In the illustrative embodiment, data management service 235 initializes staging storage 500 by inserting a Null value into column 533 of each record. Accordingly, data management service 235 inserts a Null value in column 533 of records 511, 512, 513, . . . , 516, as shown in FIG. 5.

At step 335, a repair procedure is initiated with respect to the second volume. Data management service 235 instructs repair process 280 to repair data in volume 138. Repair process 280 accesses volume 138 and commences a repair procedure to examine and repair data, as necessary.

Virtual Interface

During and after repair and mounting procedures, data management service 235 uses virtual interface 270 to manage instructions related to volume 138. For example, during the repair procedure, virtual interface 270 may redirect to staging storage 500 selected instructions directed to volume 138, including, for example, instructions which cause a change to the data in volume 138. Similarly, when a user accesses and inspects volume 138, virtual interface 270 may selectively redirect instructions relating to volume 138.

Figure 6A:
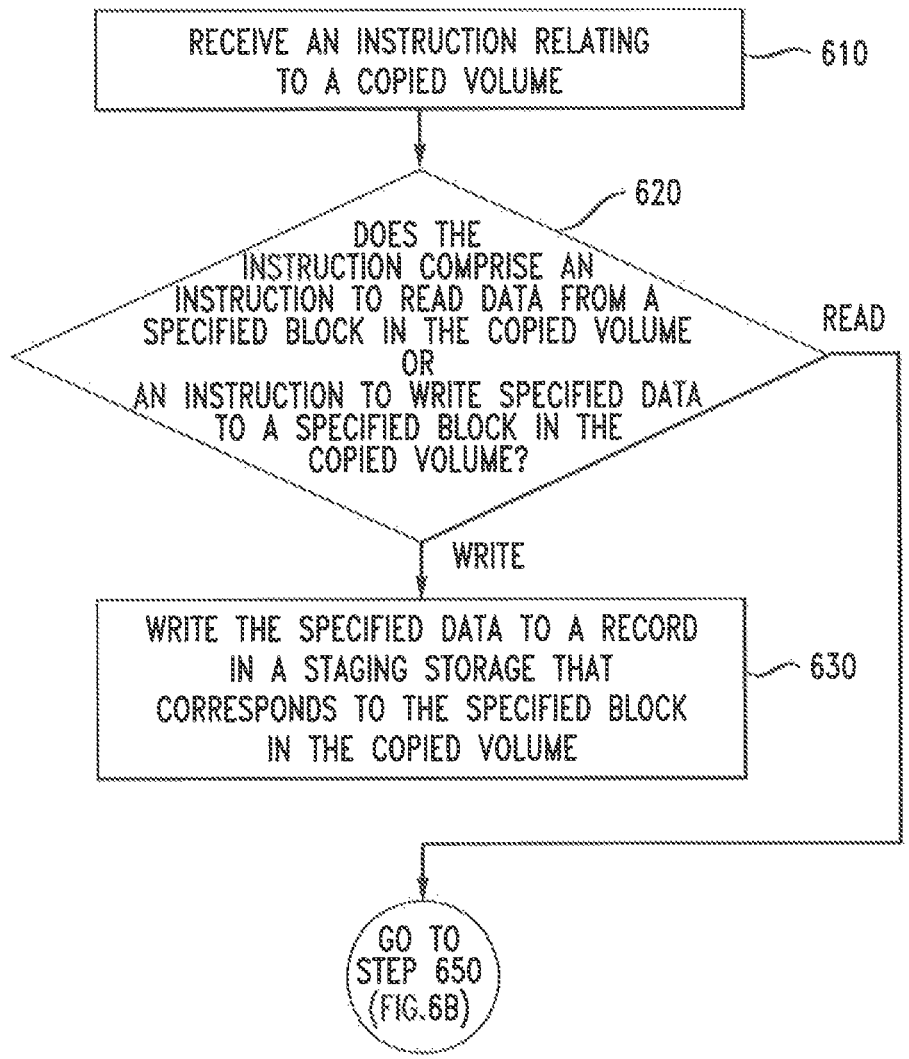
FIGS. 6A-6B include a flowchart representing a set of logic rules associated with a virtual interface in accordance with an embodiment.
Figure 6B:
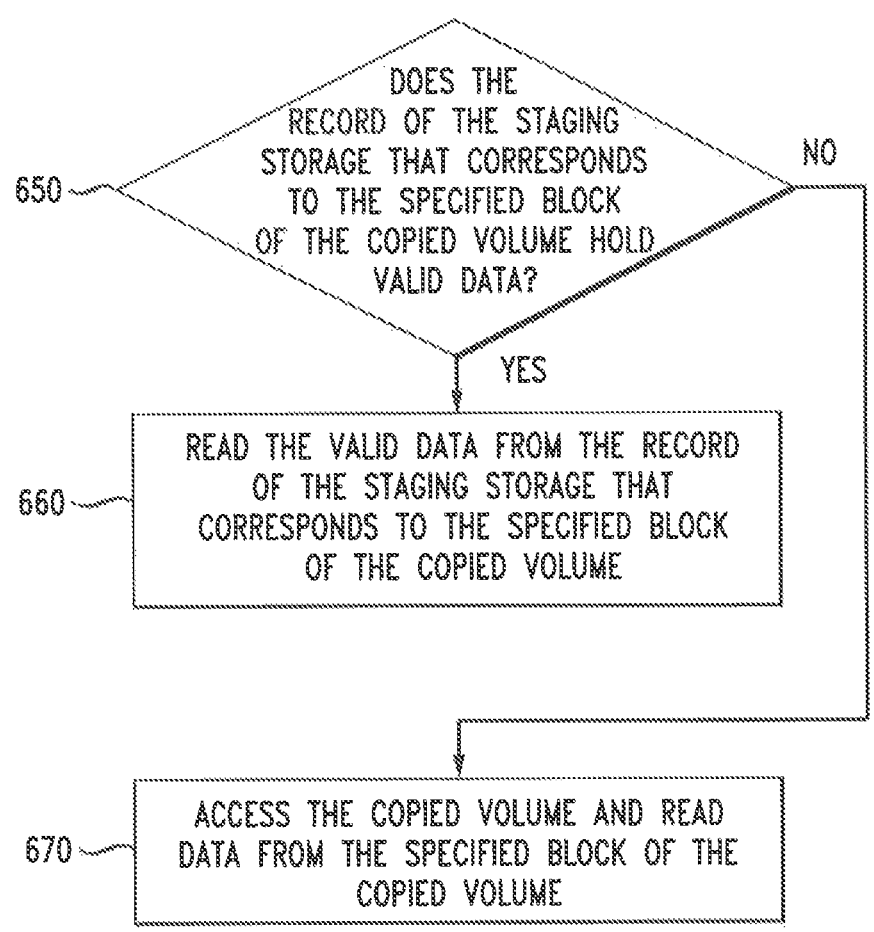

Virtual interface 270 comprises a set of logic rules. FIGS. 6A-6B include a flowchart representing a set of logic rules that may be implemented by virtual interface 270 in accordance with an embodiment. The rules are applied to each incoming instruction that pertains to volume 138. The particular set of rules set forth in FIGS. 6A-6B are applicable to a volume comprising a plurality of data blocks, such as volume 138. In other embodiments, similar sets of rules may be constructed and used with respect to data organized or structured in a different manner.

Referring to FIG. 6A, at step 610, an instruction relating to a copied volume is received. In accordance with step 620, a determination is made as to whether the instruction comprises an instruction to read data from a specified block in the copied volume or an instruction to write specified data to a specified block in the copied volume.

If the instruction comprises an instruction to write specified data to a specified block in the copied volume, the logic proceeds to step 630. At step 630, the specified data is written to a record in a staging storage that corresponds to the specified block (and the specified data is not written in the copied volume).

Referring again to block 620, if the instruction comprises an instruction to read data from a specified block of the copied volume, the logic proceeds to step 650 (of FIG. 6B).

Referring to FIG. 6B, at step 650, a determination is made as to whether the record of the staging storage that corresponds to the specified block of the copied volume holds valid data. If the record of the staging storage that corresponds to the specified block of the copied volume holds valid data, the logic proceeds to step 660. At step 660, the valid data is read from the record of the staging storage that corresponds to the specified block of the copied volume (and no data is read from the copied volume).

If the record of the staging storage that corresponds to the specified block of the copied volume does not contain valid data, the logic proceeds to step 670. At step 670, the copied volume is accessed, and data is read from the specified block of the copied volume.

Figure 7:
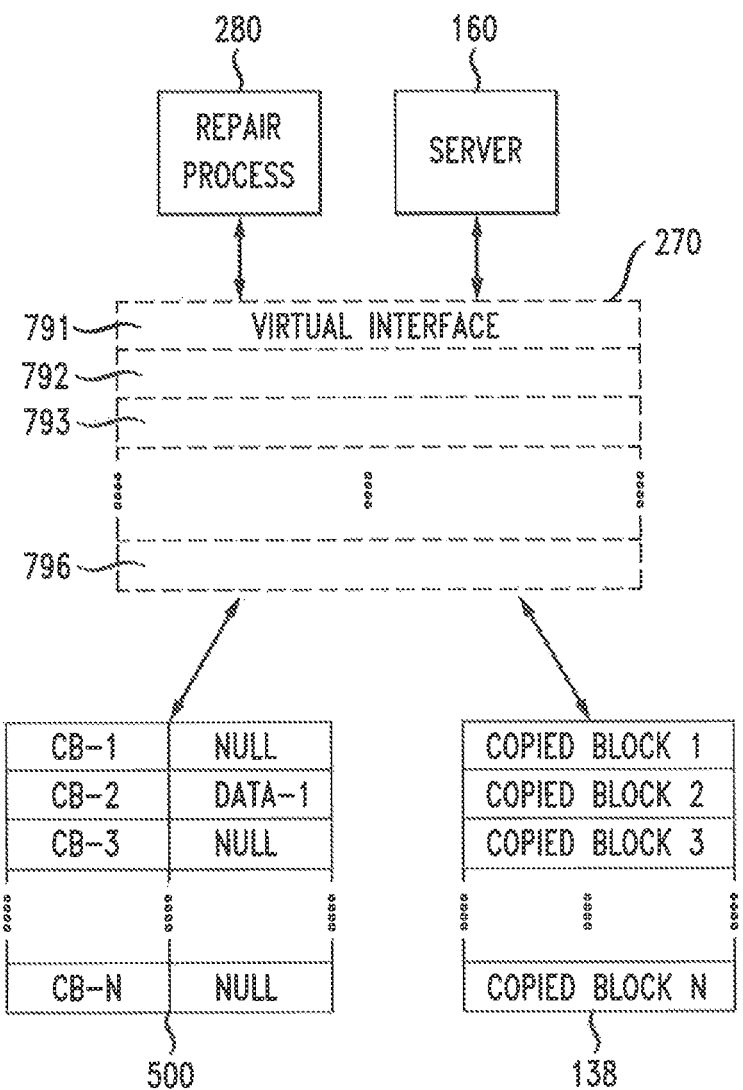
FIG. 7 illustrates a virtualization function provided by a virtual interface during and after repair and mounting procedures in accordance with an embodiment.

By implementing the rules set forth in FIGS. 6A-6B, virtual interface 270 may present to a user a virtual copied volume. FIG. 7 illustrates schematically the virtualization function provided by virtual interface 270 during and after repair and mounting procedures in accordance with an embodiment. Specifically, virtual interface 270 may present to a user of server 160 a virtual copied volume having a plurality of virtual blocks, including virtual blocks 791, 792, 793, 796, etc., which may be accessed and inspected. Virtual interface 270 receives instructions from repair process 280 and from server 160, and redirects each instruction either to staging storage 500 or to volume 138 in accordance with the logic rules set forth in FIGS. 6A-6B. FIG. 7 is illustrative only and is not to be construed as limiting with respect to the functions of, or relationships among, virtual interface 270, repair process 280, server 160, staging storage 500, and volume 138.

In one embodiment, in order to ensure transparency, virtual interface 270 receives all instructions directed to volume 138. For example, all instructions generated by server 160 and directed to volume 138, including read instructions and write instructions, are transmitted by server 160 to data manager 120, and are forwarded to virtual interface 270. Similarly, all instructions generated by repair process 280 and directed to volume 138, including read instructions and write instructions, are forwarded to virtual interface 270.

During the repair procedure, and during any inspection of volume 138 by a user, each instruction directed to volume 138 is received by virtual interface 270 and selectively redirected either to staging storage 500 or to volume 138, based on the type of instruction and on data stored in staging storage 500. Examples of various types of instructions, and the manner of processing such instructions, are described below with reference to the method of FIGS. 3A-3B.

Returning to the illustrative embodiment discussed above, during the repair procedure, write instructions are redirected to staging storage 500. Suppose that repair process 280 examines volume 138 and determines that it is necessary to repair a certain portion of the data therein. In particular, suppose that repair process 280 determines that repairing volume 138 requires performing a write operation with respect to Copied Block 3 (483) of volume 138. Repair process 280 accordingly issues an instruction to write data to Copied Block 3 (483).

At step 340, a first instruction to write first data to a first specified block of the second volume is received during the repair procedure. Virtual interface 270 receives the instruction generated by repair process 280.

Figure 8:
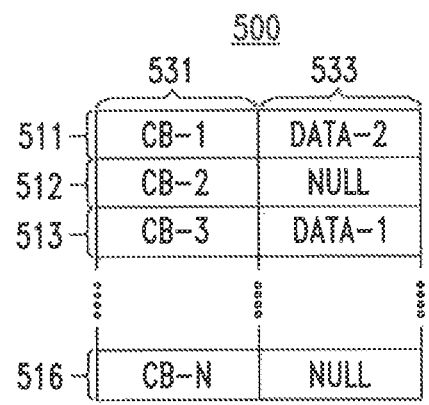
FIG. 8 shows the staging storage of FIG. 5 after a record has been updated.

In accordance with the rules set forth in FIGS. 6A-6B, because the instruction comprises an instruction to write data to volume 138, the instruction is selectively redirected to staging storage 500. Thus, at step 350, the first data is written to a record in the staging storage that corresponds to the first specified block, in response to the first instruction. Virtual interface 270 accesses staging storage 500 and writes the specified data to record 513, which corresponds to Copied Block 3 (483) of volume 138. FIG. 8 shows staging storage 500 after record 513 has been updated to hold the specified data associated with the write instruction. Column 533 of record 513 now holds the data (represented in FIG. 8 as DATA-1) specified in the write instruction.

Repair process 280 continues to repair data in volume 138 until the data is repaired successfully. During the repair procedure, repair process 280 may issue additional instructions pertaining to volume 138. Virtual interface 270 intercepts such instructions and processes the instructions in the manner described above. For example, suppose that repair process 280 determines that certain data in Copied Block 1 (481) must be repaired, and issues an instruction to write data to Copied Block 1 (481). In accordance with the logic set forth in FIGS. 6A-6B, virtual interface 270 redirects the instruction to staging storage 500. Virtual interface 270 determines that record 511 of staging storage corresponds to Copied Block 1 (481) of volume 138, and accordingly writes the data to record 511. The data written to record 511 of staging storage is represented as "DATA-2" in FIG. 8.

In the illustrative embodiment, during the repair procedure, repair process 280 issues instructions to write data to Copied Block 1 (481) and to Copied Block 3 (483) of volume 138. Repair process 280 does not issue instructions to write data to Copied Block 2 (482) or to Copied Block N (486) of volume 138. Thus, record 512 of staging storage 500, which corresponds to Copied Block 2 (482) of volume 138, contains a Null value after completion of the repair procedure, as shown in FIG. 8. Similarly, record 516 of staging storage 500, which corresponds to Copied Block N (486) of volume 138, contains a Null value after completion of the repair procedure.

During the repair procedure, instructions to read data from volume 138 that are issued by repair process 280 are selectively redirected to staging storage 500 or to volume 138, in accordance with the rules set forth in FIGS. 6A-6B. For example, suppose that repair process 280 issues an instruction to read data from Copied Block N (486). Virtual interface 270 receives the instruction and examines the instruction. Virtual interface 270 accesses staging storage 500 and examines record 516, which corresponds to Copied Block N (486). Virtual interface 270 determines that record 516 does not contain valid data. Accordingly, virtual interface 270 accesses volume 138 and reads data from Copied Block N (486).

At step 360, the second volume is mounted after completion of the repair operation. After repair process 280 completes the process of repairing the data in volume 138, repair process 280 informs data management service 235. Data management service 235 now mounts volume 138 to enable the user of server 160 to access and examine the data in volume 138.

After volume 138 is mounted (e.g., while the user is inspecting volume 138), any instructions to read data from volume 138 are processed in accordance with the rules set forth in FIGS. 6A-6B. Thus, an instruction to read data from a specified block of volume 138 that is issued by server 160 is received by virtual interface 270. Virtual interface 270 examines the record of staging storage 500 that corresponds to the specified block. If the record contains valid data, virtual interface 270 retrieves the valid data from the record of staging storage 500, and transmits the data to server 160. If the record does not contain valid data, virtual interface 270 access volume 138 and reads the specified block.

In the illustrative embodiment, after volume 138 is mounted, the user accesses volume 138 and examines selected portions of the volume. Suppose, for example, that the user wishes to examine data in Copied Block 3 (483) of volume 138. Server 160 accordingly transmits an instruction to read data from Copied Block 3 (483) of volume 138.

At step 370, a second instruction to read data from the first specified block of the second volume is received. Virtual interface 270 receives the instruction issued by server 160 and determines that it comprises an instruction to read data from Copied Block 3 (483) of volume 138.

At step 375, a determination is made that the first record of the staging storage includes valid data. Virtual interface 270 accesses staging storage 500 and examines a record 513, which corresponds to Copied Block 3 (483) of volume 138. Referring to FIG. 8, virtual interface 270 examines record 513 and determines that the record contains valid data (DATA-1).

At step 380, the first data is read from the first record of the staging storage, in response to determining that the first record of the staging storage includes valid data. Virtual interface 270 accordingly reads the data (DATA-1) stored in record 513 of staging storage 500, and transmits the data to server 160. Server 160 provides the data (DATA-1) to the user.

Suppose now that the user continues to inspect volume 138, and reads data in other blocks. In particular, the user next wishes to read data in Copied Block 2 (482) of volume 138. Server 160 accordingly transmits an instruction to read data from Copied Block 2 (482) of volume 138.

At step 385, a third instruction to read data from a second specified block of the second volume is received. Virtual interface 270 receives the instruction from server 160.

At step 390, a determination is made that a second record of the staging storage that corresponds to the second specified block does not include valid data. Virtual interface 270 accesses staging storage 500 and examines record 512, which corresponds to Copied Block 2 (482). Virtual interface 270 determines that record 512 includes a Null value, and thus does not contain valid data.

At step 395, data is read from the second specified block in the second volume, in response to determining that the second record of the staging storage that corresponds to the second specified block does not include valid data. Because the record in staging storage 500 that corresponds to Copied Block 2 (482) does not contain valid data, virtual interface 270 accesses volume 138 and reads data from Copied Block 2 (482). Virtual interface 270 transmits the data retrieved from volume 138 to server 160. Server 160 provides the data to the user.

The user continues to inspect volume 138 until a determination is made that volume 138 is a complete and accurate copy of volume 136. Because volume 138 was not altered during the repair and mounting procedures (changes were redirected to and recorded in staging storage 500), volume 138 may be considered a valid copy of volume 136.

After the inspection is completed, data manager 120 may delete or remove staging storage 500 from memory.

If volume 136 was changed during the repair, mounting, and inspection procedures, volume 138 may be resynchronized with volume 136. Thus, at step 397, the second volume is resynchronized with the first volume. In the illustrative embodiment, in response to a request from the user, data management service 235 activates the resynchronization function and resynchronizes volume 138 to volume 136.

In some environments, a computer attempting to access data on a storage medium must perform multiple mounting procedures. Each mounting procedure may require a separate data repair procedure to be performed. Therefore, while in the illustrative embodiment described herein, a single repair procedure and a single mounting procedure are conducted, in other embodiments, data management service 235 causes multiple repair procedures to be completed, and performs multiple mounting procedures. The systems and methods described herein may be used in connection with multiple repair procedures and multiple mounting procedures.

Write Map

Figure 9A:
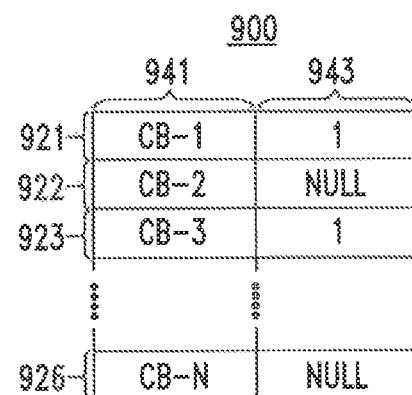
FIG. 9A shows a write map in accordance with an embodiment.

In another embodiment, virtual interface 270 may use a write map to facilitate the processing of instructions received during and after repair and mounting procedures. FIG. 9A shows a write map 900 in accordance with an embodiment. Write map 900 comprises two columns 941 and 943, and a plurality of records corresponding to records in staging storage 500. Column 941 stores identifiers of various blocks in volume 138. Thus, record 921 stores identifier CB-1, which is associated with Copied Block 1 (481) of volume 138, record 922 stores identifier CB-2, which is associated with Copied Block 2 (482), record 923 stores identifier CB-3, which is associated with Copied Block 3 (483), and record 926 stores identifier CB-N, which is associated with Copied Block N (486). Write map 900 may be stored in memory 260 (of data manager 120), as shown in FIG. 2.

Each record of write map 900 also corresponds to a record of staging storage 500. Specifically, record 921 of write map 900 corresponds to record 511 of staging storage 500. Record 922 of write map 900 corresponds to record 512 of staging storage 500. Record 923 of write map 900 corresponds to record 513 of staging storage 500. Record 926 of write map 900 corresponds to record 516 of staging storage 500.

Column 943 of write map 900 stores information indicating whether the corresponding record of staging storage 500 contains valid data. For example, column 943 of a particular record of write map 900 may hold a predetermined indicator, such as "1" bit, to indicate that the corresponding record of staging storage 500 contains valid data. A Null value in column 943 of the record indicates that the corresponding record of staging storage 500 does not contain valid data.

In one embodiment, when a repair procedure is initiated and staging storage 500 is created and initialized, data management service 235 also creates write map 900. Data management service 235 initializes write map 900 by inserting a Null value into column 943 of each record. During the repair procedure, when repair process 280 issues an instruction to write data to a specified block of volume 138, virtual interface 270 receives and redirects the write instruction, and writes the data in the corresponding record of staging storage 500, in the manner discussed above. Virtual interface 270 also records, in a corresponding record of write map 900, information indicating that data has been written to the corresponding record of staging storage 500.

Figure 9B:
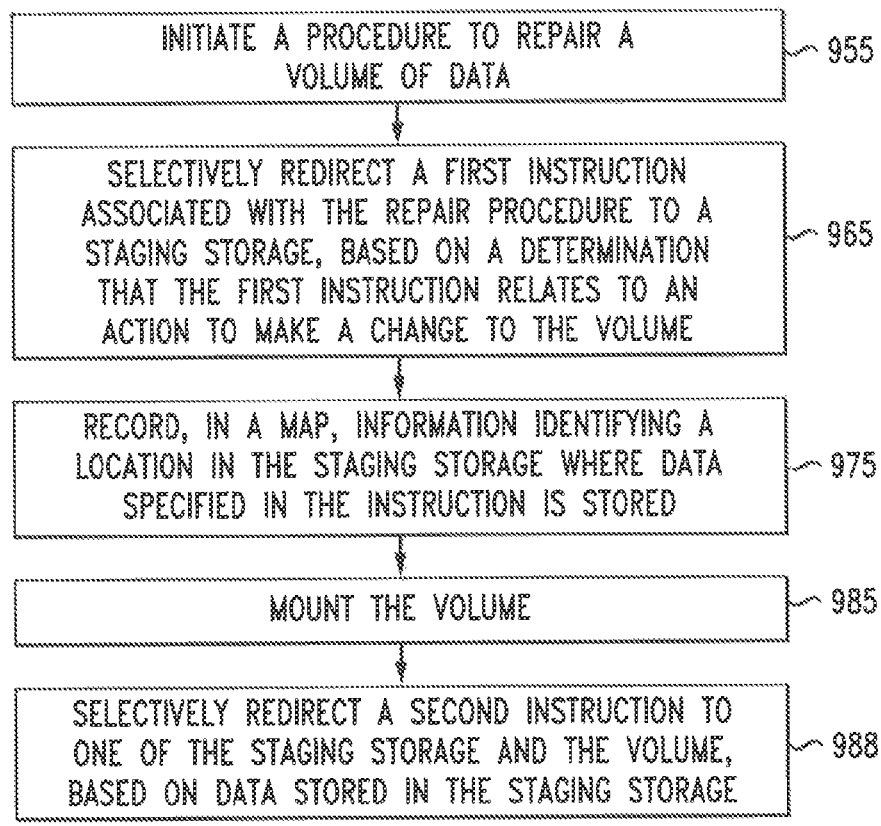
FIG. 9B is a flowchart of a method of repairing and providing access to a copied volume of data in accordance with an embodiment.

FIG. 9B is a flowchart of a method of repairing and providing access to a copied volume of data in accordance with an embodiment. At step 955, a procedure to repair a volume of data is initiated. Referring to the illustrative embodiment discussed above, prior to mounting volume 138, data management service 235 instructs repair process 280 to repair the data in volume 138. Repair process 280 accordingly initiates a repair procedure with respect to the data in volume 138.

At step 965, a first instruction associated with the repair procedure is selectively redirected to a staging storage, based on a determination that the first instruction relates to an action to make a change to the volume. Referring again to the illustrative embodiment discussed above, when repair process 280 issues an instruction to write data to Copied Block 3 (483) of volume 138, virtual interface 270 determines that writing data to Copied Block 3 (483) will change volume 138, and accordingly redirects the instruction and writes the data in record 513 of staging storage 500, which corresponds to Copied Block 3 (483). Referring again to FIG. 8, the data (represented as "DATA-1") is stored in record 513 of staging storage 500.

At step 975, information identifying a location in the staging storage where data specified in the instruction is stored is recorded in a map. Virtual interface 270 accesses write map 900, and inserts in record 923 (which corresponds to Copied Block 3 (483) and record 513 of staging storage 500) an indication that the corresponding record of staging storage 500 contains valid data. For example, virtual interface 270 may insert a "1" bit in column 943 of record 923, as shown in FIG. 9A, indicating that record 513 of staging storage 500 contains valid data. Similarly, when repair process 280 issues an instruction to write data to Copied Block 1 (481) of volume 138, virtual interface 270 writes the data in record 511 of staging storage 500, and inserts a "1" bit in record 921 of write map 900 (which corresponds to Copied Block 1 (481) and to record 511 of staging storage 500), indicating that the corresponding record of staging storage 500 contains valid data.

In the illustrative embodiment of FIG. 9A, records 922 and 926 of write map 900 retain Null values after completion of the repair procedure, because no data was written to the records of staging storage 500 which correspond to these particular records of write map 900.

At step 985, the volume is mounted. Again referring to the illustrative embodiment described above, when repair process 280 informs data management service 235 that the repair process is complete, data management service 235 mounts volume 138. After volume 138 is mounted, virtual interface 270 may utilize write map 900 to facilitate the processing of instructions received from server 160.

At step 988, a second instruction is selectively redirected to one of the staging storage and the volume, based on data stored in the staging storage. For example, when an instruction to read data from Copied Block 3 (483) of volume 138 is received from server 160, virtual interface 270 may access write map 900 and examine record 923 (which corresponds to Copied Block 3 (483), and to record 513 of staging storage 500). Virtual interface 270 determines that record 923 contains a "1," indicating that the corresponding record of staging storage 500 contains valid data. Virtual interface 270 therefore accesses staging storage 500, reads data from the corresponding record 513 of staging storage 500, and provides the data ("DATA-1") to server 160. Supposing that an instruction to read data from Copied Block 2 (482) of volume 138 is received from server 160, virtual interface 270 accesses write map 900 and examines record 922 (which corresponds to Copied Block 2 (482), and to record 512 of staging storage 500). Virtual interface 270 determines that record 922 of write map 900 contains a Null value, and therefore concludes that the corresponding record of staging storage 500 does not contain valid data. Virtual interface 270 therefore accesses volume 138, reads data from Copied Block 2 (482) of volume 138, and provides the data to server 160.

Systems, methods, and apparatus described herein may be used advantageously to copy a selected volume of data, repair the copied volume, and provide access to the copied volume while ensuring the copied volume is not altered. In other embodiments, systems, methods, and apparatus described herein may be used advantageously to copy other units of data, such as a selected file, sector, disk, etc., and subsequently repair the copied data and provide access to the copied data while ensuring the copied data is not altered. Systems, methods and apparatus described herein may be used in connection with a variety of operations including backing up data, generating a snapshot of data, replicating data, migrating data, etc.

In various embodiments, the method steps described herein, including the method steps described in FIGS. 3A-3B, 6A-6B, and/or 9B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 3A-3B, 6A-6B, and/or 9b, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 10:
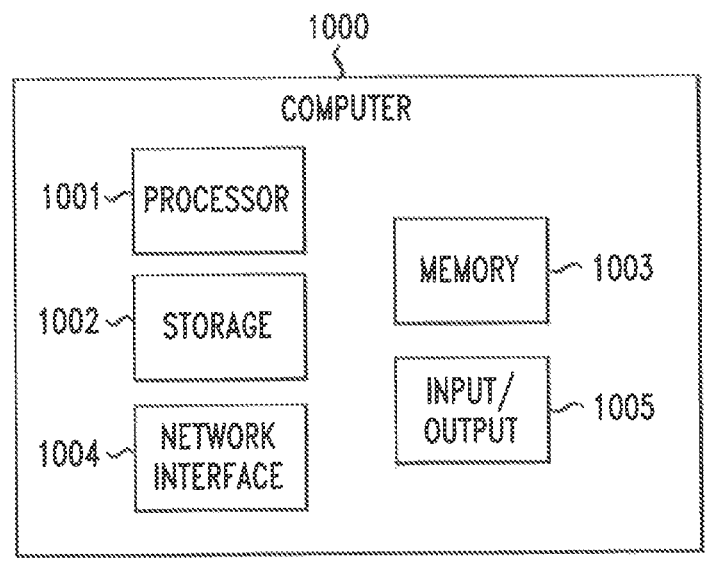
FIG. 10 shows components of an exemplary computer that may be used to implement certain embodiments of the invention.

A high-level block diagram of an exemplary computer that may be used to implement systems, apparatus and methods described herein is illustrated in FIG. 10. Computer 1000 includes a processor 1001 operatively coupled to a data storage device 1002 and a memory 1003. Processor 1001 controls the overall operation of computer 1000 by executing computer program instructions that define such operations. The computer program instructions may be stored in data storage device 1002, or other computer readable medium, and loaded into memory 1003 when execution of the computer program instructions is desired. Thus, the method steps of FIGS. 3A-3B, 6A-6B, and/or 9B can be defined by the computer program instructions stored in memory 1003 and/or data storage device 1002 and controlled by the processor 1001 executing the computer program instructions. For example, the computer program instructions can be implemented as computer executable code programmed by one skilled in the art to perform an algorithm defined by the method steps of FIGS. 3A-3B, 6A-6B, and/or 9B. Accordingly, by executing the computer program instructions, the processor 1001 executes an algorithm defined by the method steps of FIGS. 3A-3B, 6A-6B, and/or 9B. Computer 1000 also includes one or more network interfaces 1004 for communicating with other devices via a network. Computer 1000 also includes one or more input/output devices 1005 that enable user interaction with computer 1000 (e.g., display, keyboard, mouse, speakers, buttons, etc.).

Processor 1001 may include both general and special purpose microprocessors, and may be the sole processor or one of multiple processors of computer 1000. Processor 1001 may include one or more central processing units (CPUs), for example. Processor 1001, data storage device 1002, and/or memory 1003 may include, be supplemented by, or incorporated in, one or more application-specific integrated circuits (ASICs) and/or one or more field programmable gate arrays (FPGAs).

Data storage device 1002 and memory 1003 each include a tangible non-transitory computer readable storage medium. Data storage device 1002, and memory 1003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1005 may include peripherals, such as a printer, scanner, display screen, etc. For example, input/output devices 1005 may include a display device such as a cathode ray tube (CRT) or liquid crystal display (LCD) monitor for displaying information to the user, a keyboard, and a pointing device such as a mouse or a trackball by which the user can provide input to computer 1000.

Any or all of the systems and apparatus discussed herein, including server 160, data manager 120, storage 165, storage 172, and components thereof, including data management service 235, repair process 280, virtual interface 270, and memory 260, may be implemented using a computer such as computer 1000.

One skilled in the art will recognize that an implementation of an actual computer or computer system may have other structures and may contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of copying and providing access to a copied volume of data, the method comprising:
   copying a first volume stored at a first location, the first volume comprising a first plurality of blocks, to a second volume stored at a second location, the second volume comprising a second plurality of blocks;
   generating a staging storage having a plurality of records corresponding to the second plurality of blocks;
   receiving, during a repair procedure, a first instruction to write specified data to a first specified block of the second volume;
   writing the specified data to a record of the staging storage that corresponds to the first specified block, in response to the first instruction;
   mounting the second volume after completion of the repair operation;
   receiving a second instruction to read data from the first specified block of the second volume;
   determining that the record of the staging storage includes valid data; and
   reading the specified data from the record of the staging storage, in response to determining that the record of the staging storage includes valid data.

2. The method of claim 1, further comprising:
   receiving, during the repair procedure, a third instruction to read data from a second specified block of the second volume;
   determining that a second record of the staging storage that corresponds to the second specified block does not include valid data; and
   reading data from the second specified block of the second volume, in response to determining that a second record of the staging storage that corresponds to the second specified block does not include valid data.

3. The method of claim 2, further comprising:
   generating a map having a second plurality of records corresponding to the plurality of records in the staging storage;
   storing, in a selected record of the map, information indicating that the record of the staging storage includes valid data, in response to writing the first data to the record of the staging storage.

4. The method of claim 3, further comprising:
   determining that the record of the staging storage includes valid data, based on the information stored in the map; and
   determining that the second record of the staging storage that corresponds to the second specified block does not include valid data, based on second information stored in the map.

5. The method of claim 1, further comprising:
   resynchronizing the second volume with the first volume.

6. A method of repairing and providing access to a volume of data, the method comprising:
   initiating a procedure to repair a volume of data;
   selectively redirecting a first instruction associated with the repair procedure to a staging storage, based on a determination that the first instruction relates to an action that makes a change to the volume;
   selectively redirecting a second instruction to one of the staging storage and the volume, based on data stored in the staging storage;
   selectively redirecting the first instruction to the staging storage, based on a determination that the first instruction comprises an instruction to write specified data to a specified block of the volume; and
   writing the specified data to a record of the staging storage that corresponds to the specified block;
   wherein the second instruction comprises an instruction to read data from a second specified block of the volume, the method further comprising:
      redirecting the second instruction to the staging storage, if a second record in the staging storage that corresponds to the second specified block includes valid data; and
      redirecting the second instruction to the volume, if the second record does not include valid data.

7. A device comprising:
   a memory storing computer program instructions; and
   a processor configured to execute the computer program instructions which, when executed on the processor, cause the processor to perform operations comprising:
      initiating a procedure to repair a volume of data;
      selectively redirecting a first instruction associated with the repair procedure to a staging storage, based on a determination that the first instruction relates to an action that makes a change to the volume;
      selectively redirecting a second instruction to one of the staging storage and the volume, based on data stored in the staging storage;
      selectively redirecting the first instruction to the staging storage, based on a determination that the first instruction comprises an instruction to write specified data to a specified block of the volume; and
      writing the specified data to a record of the staging storage that corresponds to the specified block;
      wherein the second instruction comprises an instruction to read data from a second specified block of the volume, the operations further comprising:
         redirecting the second instruction to the staging storage, if a second record in the staging storage that corresponds to the second specified block includes valid data; and
         redirecting the second instruction to the volume, if the second record does not include valid data.

8. An apparatus comprising:
means for initiating a procedure to repair a volume of data;
means for selectively redirecting a first instruction associated with the repair procedure to a staging storage, based on a determination that the first instruction relates to an action that makes a change to the volume;
means for selectively redirecting a second instruction to one of the staging storage and the volume, based on data stored in the staging storage;
means for selectively redirecting the first instruction to the staging storage, based on a determination that the first instruction comprises an instruction to write specified data to a specified block of the volume; and
means for writing the specified data to a record of the staging storage that corresponds to the specified block;
wherein the second instruction comprises an instruction to read data from a second specified block of the volume, the apparatus further comprising:
 means for redirecting the second instruction to the staging storage, if a second record in the staging storage that corresponds to the second specified block includes valid data; and
 means for redirecting the second instruction to the volume, if the second record does not include valid data.

* * * * *